Feb. 5, 1957 G. E. HANSEN 2,780,434
RENEWABLE BUSHING FOR A VALVE ACTUATOR
Filed March 31, 1952 2 Sheets-Sheet 2
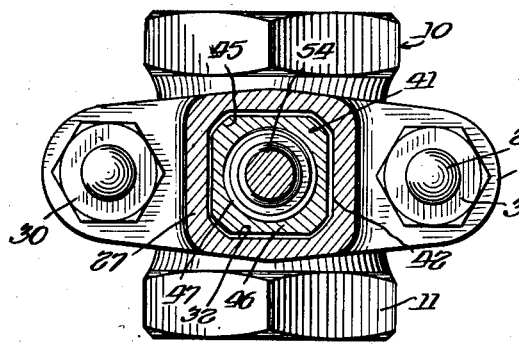
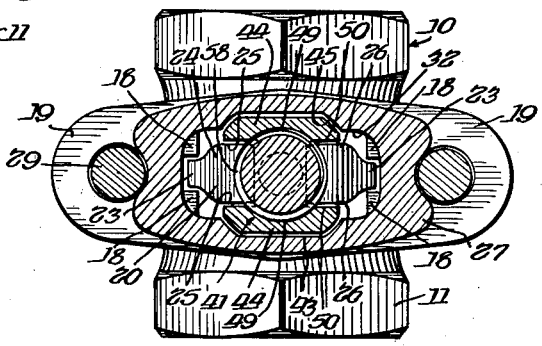
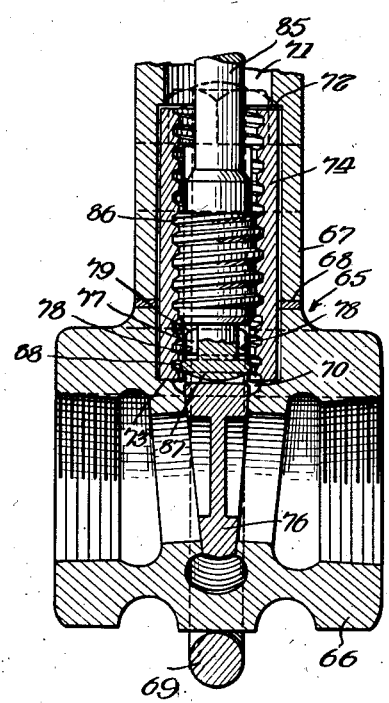
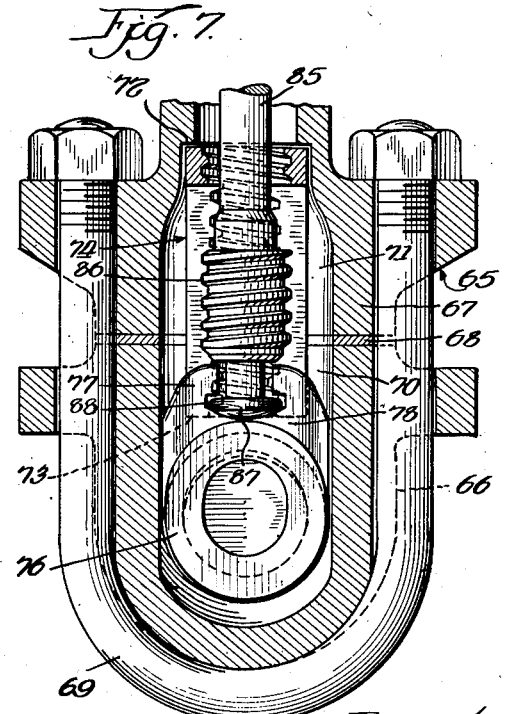
Inventor.
George E. Hansen.
By Joseph O. Lange Atty.

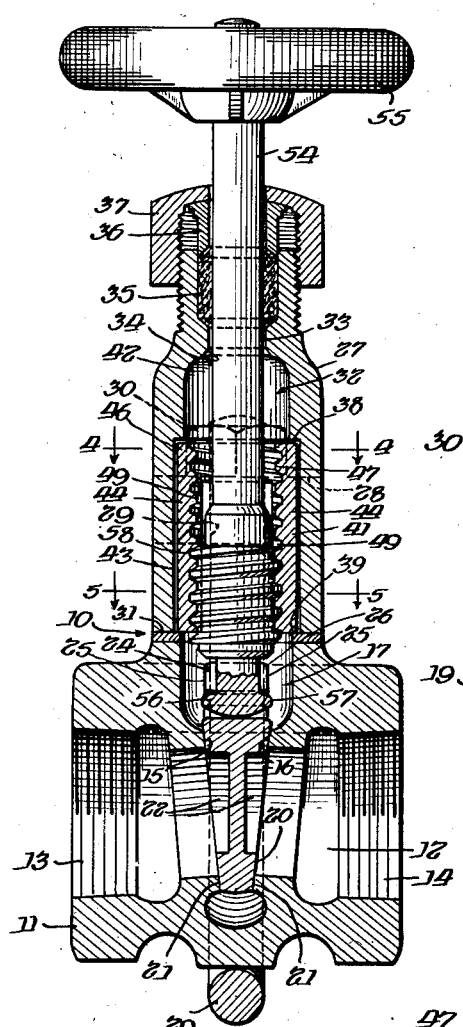

United States Patent Office 2,780,434
Patented Feb. 5, 1957

2,780,434

RENEWABLE BUSHING FOR A VALVE ACTUATOR

George E. Hansen, Elmwood Park, Ill., assignor to Crane Co., Chicago, Ill., a corporation of Illinois Application March 31, 1952, Serial No. 279,650

2 Claims. (Cl. 251—222)

This invention relates generally to improvements in rising stem valves, and more particularly to improvements in inside screw rising stem valves.

One object of the invention is to provide in valves of the above type threaded bushings of simple design which are inexpensive and easy to renew or replace.

Another object is to produce a bushing of simple form which at the same time will not rotate within the valve casing or housing more than a permissible amount.

A further object is to furnish a bushing of simple shape which will also tend to eliminate the building-up of undesirable pressure and allow for relief of the same and drainage of entrapped fluid collected thereabove.

A still further object is to provide a threaded bushing of the above type which possesses more desirable compactness than heretofore available.

A yet further object is to provide a bushing which affords guidance to the valve disc or closure member when moving to or from its seated position.

In previous valves of the type above set forth, the renewable bushings thereof and the interiors of the valves receiving the same have been characterized by turned or reduced portions, projections, lugs, wings, ribs, and notches or corresponding recesses therefor and also special passages for the drainage of fluid.

The present design on the other hand calls for a bushing of simple, block-like form, being prevented from rotating more than a permissible slight amount by a generally polygonal shape which cooperates with a similarly shaped valve interior within which the bushing is received. A relatively loose fit is had between the bushing and receiving portion, both laterally and longitudinally, to allow for self-alignment of the valve stem and to insure a tight fit between the bonnet and body portions. The bushing and receiving portion may, therefore, be cast, thus eliminating any need for machining. Slight clearance longitudinally, as well as around the sides of the bushing also assists in the relief of pressure and fluid drainage from the upper part of the bonnet.

Also characteristic of prior valves is the use therein of long valve stems having extensive threading and engaging bushings positioned well up in the bonnets. In the present invention, however, a reduction of overall valve height and greater compactness is achieved by the use of a bushing having a slotted or spaced, depending leg formation. The legs of this bushing extend well down within the valve interior and are recessed or threaded on the inner walls thereof for engagement, in cooperation with a threaded opening at the top, of a relatively short threaded portion of the valve stem. This arrangement provides the necessary threading for the operation of the valve while at the same time and without loss of function permits reception of the valve closure within the slot or spacing. The latter arrangement affords a lower positioning of the bushing which, in cooperation with the relatively short threaded portion of the valve stem, greatly reduces the overall length or height of the valve. As a consequence, the valve of this invention is adapted to use in more restricted areas. Besides the reduction in length or height, the absence of lateral projections on the bushing and corresponding recesses in the housing and also the elimination of special flow passages result in the use of less metal consequently effect a saving in cost and weight, further resulting in greater compactness of valve design.

Another advantage of the valve design is that sufficient relief of pressure and fluid drainage is afforded without the need of special flow passages. This is accomplished largely by the relatively loose fit of the bushing within the housing which, in cooperation with the relatively thin or limited upper portion of the bushing having a solid or uninterrupted exterior and the open slot therebelow, permits relief and drainage around the outside. Also, the bushing has a relatively limited area of continuous threading at the top, unlike the prior art, which in cooperation with the by far greater extent of interrupted threading therebelow provide less restriction to relief and drainage therethrough when the valve is open. When the valve is closed, however, and the threaded portion of the stem is entirely engaged by the interrupted threading of the slotted or spaced depending leg portion of the bushing, a passage is provided between the upper part of the stem and the threading in the top of the bushing. Fluid and sediment may pass freely therethrough. Moreover, when the valve is cracked and moved towards open position, the continuous threading and the hollow chamber thereabove are cleansed and flushed by a substantial flow of fluid into the hollow interior of the valve on the inlet side of the valve disc and an aspiratory effect on the outlet side thereof. This cleansing action will continue until the threaded portion of the stem enters the threaded opening at the top of the bushing. Inasmuch as the valve closure will then be substantially withdrawn from the flow passage through the bottom of the valve, fluid flow into the hollow interior of the valve will then have substantially ceased and the aspiratory effect will then be nearly at its maximum. The latter will tend to draw out remaining fluid in the upper chamber and as the threaded stem portion turns within the threaded opening at the top of the bushing, this fluid will be further squeezed out. The aspiratory effect preserves the drained condition when the valve is open.

Related to the flushing or cleansing of the valve interior and of the threading in the bushing is the wiping or cleansing effect of the thread-to-thread engagement. The intermittent engagement of the relatively small area of continuous threading at the top and the interrupted nature of the engagement with the depending leg portions tends to the dislodge or wipe out any accumulation of sediment and prevent the caking or packing thereof which is common in the case of long continuous threading. The spacing between the leg portions provides a channel for carrying away the dislodged material.

Still another and important feature of the present invention comprises improved guiding for the valve member or gate as it is being opened or closed, the guiding being afforded by the close association of the inner walls of the slotted bushing with the outer flat surfaces of the upper portion of the valve member. The particular width of the slot and of the valve closure is optional and need not approximate the thread diameter in the bushing, but it is essential that a fairly close fit be had between the valve member and bushing. This arrangement eliminates the usual guiding in the bonnet and in a modified form in the valve body as well. In the latter, the depending side portions of the bushing are considerably longer and extend well into the valve body. Besides greater guiding, this embodiment helps to align the body and bonnet portions when assembled.

A further advantage of the present invention is the greater length of threading in the bushing which extends to the bottom of the bonnet and in the modification considerably therebelow and into the body portion giving support and guidance to the valve stem throughout its travel and particularly at the bottom of its movement to minimize canting and distortion thereof and to preserve a better alignment and more positive connection between the valve stem and disc. Also to this end, the button at the bottom of the stem is only slightly less in diameter than the threading in the bushing, thus giving a snug fit and preventing any appreciable side motion of the stem at its lower extremity. To prevent injury to any of the threads, the upper and lower edges of the button and the upper edges of the valve closure have been rounded.

A still further advantage resides in the bifurcated or slotted formation of the bushing which permits flexing of the depending legs in response to slight inaccuracies in or distortions of the stem or threaded portion thereof or in the relieved interior of the valve to the extent that assembly and suitable operation of the valve is not interfered with or interrupted. A certain resiliency of these depending portions tends to preserve a snug fit with the valve stem and further assists the wiping action of the bushing and stem threads.

Other objects and advantages will become apparent from the following description and the accompanying drawing in which:

Fig. 1 is a vertical or longitudinal section of a valve embodying the present invention.

Fig. 2 is a vertical or longitudinal section of the valve taken at right angles to that of Fig. 1.

Fig. 3 is an exterior perspective view of the bushing of the invention.

Fig. 4 is a transverse section taken on line 4—4 of Fig. 1.

Fig. 5 is a similar view taken on line 5—5 of Fig. 1.

Fig. 6 is a fragmentary sectional assembly view of a modified form of the invention.

Fig. 7 is a fragmentary sectional assembly view similar to Fig. 6, but at right angles thereto.

Similar reference numerals refer to similar parts throughout the several views.

Referring to the drawing and particularly to Fig. 1 thereof, 10 designates the casing or housing of an inside rising stem gate valve comprising a body 11 and a bonnet 27 supported in sealed relation thereon.

The body is provided with the usual flow passage 12 having an inlet 13 and an outlet 14. The body portion also includes valve seats 15 and 16 and a hollow chamber 17 thereabove communicating with the flow passage. The usual valve guides 18 are furnished in the body and also flange 19 on the outside for the reception of U-bolts 29. A valve member or closure 20 is provided for the flow passage, this member 20 including seating portions 21 and circular recesses 22 on the inlet and outlet side. The usual guide portions 23 are along the sides, and the upper portion 24 is formed into a T-head for the reception of the lower end or button head of the valve stem 56. The seating portions 21 are generally circular in form and are closer at the bottom than at the top or gage width forming a wedge-shaped closure as seen in end elevation. The upper portion 24 of the valve member has substantially flat parallel side walls 25. The uppermost edges of these sides are preferably rounded at 26 so as not to injure the threading of bushing 41. The usual gasket 31 is provided between the body portion and bonnet 27 for sealed connection thereof. The bonnet is provided with flange 28 through which passes U-bolt 29 for connection purposes. The usual nuts 30 are tightened on the U-bolt to provide a tight connection between the body and bonnet. The interior of the bonnet is hollow at 32 forming an extended chamber in cooperation with the hollow chamber of the body and includes a recess 38 for the reception of a bushing 41 of bronze or other suitable material. The bushing is held in place vertically or longitudinally by the top or end of the recess 38 and the shoulder 39 at the bottom.

The bushing when inserted within the bonnet separates the hollow interior 32 thereof forming an upper chamber 42 and a lower chamber 43. Referring particularly to Fig. 3, the bushing comprises spaced, depending side or leg portions 44 extending from an upper hub portion 46 which is relatively thin and substantially polygonal or square in transverse section, having a solid or uninterrupted exterior. The bushing is recessed therethrough, for the reception of the valve stem 54, the upper portion of the recess being a bore or round opening 47 while the greater extent thereabove is of the form of a slot 48. The opening 47 in the top has continuous threading around the inside, the inner walls or surfaces 50 of the slotted portion therebelow being recessed or having interrupted threading at 49 forming an extension to the continuous threading at the top. The edges of the polygonal or square shaped upper portion 46 are chamfered or relieved as are the edges 45 of the spaced depending portions. The inwardly directed surfaces 50 of the depending leg portions are preferably flat and parallel, the spacing of the leg portions and of these inner surfaces being only slightly greater than the maximum or gage width of the valve closure and of the upper portion 24 thereof which is substantially the same in width, so as to provide a relatively snug fit for guidance of the valve member when being raised or lowered.

The valve member 20 has a stem 54 passing through the recess in the bushing and also the hollow interiors of the body and bonnet and out the bore 33 and packing 35, the latter being held in place by gland 36 and nut 37. The usual handwheel 55 surmounts the valve stem, which is connected to the valve member by means of the button head 56 which is received within the T-head of the upper portion 24 thereof. The stem is provided with a relatively short threaded portion 58 with a collar portion immediately above.

The relieved or rounded edges 45 of the bushing 41 are provided so as not to restrict or prevent a slight rotation of turning of the bushing within the polygonally shaped recess 38 for self-alignment of the valve stem. The height or length of the bushing is slightly less than the height or the length of the recess so as to provide a relatively loose fit longitudinally as well as transversely.

The diameter of the stem T-head or button head 56 must be slightly less than the diameter of the continuous and interrupted threading in the bushing so as to permit passage therethrough. The slot 48, however, may be of any desired width so long as the relationship with the upper portion of the valve member selected is that of a relatively snug fit for valve guidance. A wider slot and thinner depending leg portions would, of course, result in a bushing having more spring action to adjust to a valve interior which is cast or otherwise slightly out of alignment and to permit a more resilient adjustment to and wiping action of the threaded portion of the valve stem as it passes therethrough. The button head 56 is rounded at the top and bottom at 57 so as not to injure the threading of the bushing. The relatively small clearance between the button head and the threads tends to eliminate any tendency of the valve stem 54 to cant or to become distorted in operation.

Referring to Figs. 6 and 7 which show a modification, 65 designates a valve housing similar to that of Figs. 1 through 5 having a body 66 and bonnet 67 with an interposed gasket 68 held together by U-bolts 69 and the usual nuts. The body has a hollow chamber 70, while the bonnet has a hollow interior 71 thereabove which forms an extended chamber with the latter. A bushing 74, which is similar to the bushing of Figs. 1 through 5, but having longer depending leg portions which extend well into the body 66, is received within recess 72 in both bonnet and body portions. The bushing has a loose fit like that of the bushing previously described to provide for the self alignment of the valve stem 85, being held in place vertically or longitudinally by a shoulder at the top of the recess 72 and a shoulder 73 at the bottom thereof, the latter being in the body portion just above the valve seats. In this embodiment, valve member 76 is not provided with the usual guide portions along its sides like that at 23 in Figs. 1 through 5, the guide portions in the housing may likewise be dispensed with. The upper portion 77 of the valve member or closure is formed into a T-head and has substantially flat, parallel sides 78. As in the embodiment of Figs. 1 through 5, the thickness of this portion is just slightly less than the width of the slot in the bushing, so as to provide a relatively snug fit therewith for the guidance and support of the valve member when unseated. The top edge of the valve closure 78 and the top and bottom edges of the button head 87 are rounded at 79 and 88 respectively, to prevent injury to the threads in the bushing. The width of the slot and of the valve closure to be guided thereby may, of course, be varied as is the case for the previous embodiment. The formation and function of this bushing is similar to that of Fig. 1 except that greater guiding and support is afforded to the valve closure and valve stem, doing away with any need for guides in the housing, and greater resiliency and flexibility is possessed by the bushing in adjusting to slight imperfections and distortions in the valve interior and of the valve stem and providing a better wiping action of the latter. Alignment of the bonnet on the body portions is also afforded when assembled.

While a substantially polygonal block-like bushing has been illustrated as being received in a continuous recess which is substantially polygonal in transverse outline, the bushing having a pair of depending legs, it should be understood that the bushing may be elongated or otherwise shaped in cross section so as to prevent more than a slight rotation within a valve interior which sufficiently or at least partly conforms thereto. Greater or lesser fluid clearance or passage may be provided around the outside of the bushing as desired and the sides of the latter may be sloping, vertical, curved or straight, or the bushing may be of constant cross section or rectangular or other shape, only at the top for instance. More than two depending legs may be present so long as space is provided for the valve stem therebetween. Reception and guiding of the valve member and threaded engagement of the valve stem may not of necessity be afforded, if for instance installation be made in a globe valve or in a non-threaded raising stem valve. Or, threading may be exclusively in the depending leg portion thereby providing a passageway between the valve stem and opening in the top at all times. On the other hand, the threading may be only in the opening at the top of the bushing. This opening may be circular, square or open to one side or it may be slotted through the threading for additional drainage in the case of a particularly viscous fluid or one having a tendency to cake. The bushing may also be positioned longitudinally by extending portions of the interior side walls of the bonnet or body portions.

While the bushing of this invention has been shown and described as applied to a valve, it is, of course, obvious that it may be employed in connection with a vast number of pressure vessels or the like or even non-pressure vessels or devices in which a journalled or threaded shaft is employed. Moreover, other embodiments and variations of the overall invention may be used, it therefore being desired that the invention not be limited by the specific forms disclosed or suggested, but rather by the appended claims read in the light of the prior art.

I claim:
1. The combination of a valve body with valve seats, a bonnet mounted on the said body, the said body having a flow passage and a chamber above the flow passage, the said bonnet having a chamber complementary to said body chamber, the upper portion of said bonnet chamber being of polygonal form in transverse section with rounded corner portions, a block-like bushing of polygonal cross-section and rounded corner portions fitted loosely within said polygonal portion of the bonnet chamber, the said bushing having an internally threaded upper annular portion and having depending therefrom oppositely disposed arms, the said body and bonnet chambers having opposite space extensions of the said chambers communicating with and being complementary to the space between the bushing arms, shoulder means provided by the said body for support of the said bushing, the said bonnet chamber having rounded corners for receiving the rounded corners of said bushing, a threaded reciprocably movable stem journalled within the internally threaded upper annular portion of the said bushing, a valve member on the inner end of the stem adapted to be moved from a closed position between said seats to an open position between said depending bushing arms, the inner surfaces of the bushing arms having fragmentary threaded areas for their full length forming a continuation of the threads of the centrally threaded annular portion of said bushing, the latter threaded areas being engageable by the said stem upon predetermined axial movement of the stem in a valve closing direction, whereby upon the occurrence of said latter stem movement the opening provided by said internally threaded annular portion of the said bushing in cooperation with the spaces between the depending arms of the said bushing and the chamber extensions of said body and bonnet drainage is effected of fluids and line materials normally trapped within the bonnet above the said bushing at and immediately preceding valve closed position.

2. The subject matter of claim 1, the valve seats projecting within said body, the lower end limit of the depending arms of the said bushing resting upon said seats and providing a support for the said bushing against substantial longitudinal movement.

References Cited in the file of this patent
UNITED STATES PATENTS

| | | |
|---|---|---|
| D. 22,813 | Rouse | Sept. 26, 1893 |
| 225,369 | Hart | Mar. 9, 1880 |
| 426,185 | Ibbotson | Apr. 22, 1890 |
| 792,884 | Eicher | June 20, 1905 |
| 1,196,199 | Baird | Aug. 29, 1916 |
| 1,380,527 | Carr | June 7, 1921 |
| 2,062,422 | Meese | Dec. 1, 1936 |
| 2,091,745 | Webb | Aug. 31, 1937 |